(12) United States Patent
Putnam

(10) Patent No.: US 7,055,845 B1
(45) Date of Patent: Jun. 6, 2006

(54) ADJUSTABLE HITCH

(76) Inventor: Rex D. Putnam, 10201 Moser Dr., Bronson, MI (US) 49028

( * ) Notice: Subject to any disclaimer, the term of this patent is extended or adjusted under 35 U.S.C. 154(b) by 46 days.

(21) Appl. No.: 10/871,769

(22) Filed: Jun. 18, 2004

Related U.S. Application Data

(60) Provisional application No. 60/480,117, filed on Jun. 20, 2003.

(51) Int. Cl.
*B60D 1/01* (2006.01)
(52) U.S. Cl. ............ 280/504; 280/490.1; 280/490.5; 280/497
(58) Field of Classification Search ............ 280/456.1, 280/460.1, 461.1, 472, 490.1, 504, 511, 512, 280/513, 507, 491.5, 497
See application file for complete search history.

(56) References Cited

U.S. PATENT DOCUMENTS

| | | | |
|---|---|---|---|
| 2,491,143 A * | 12/1949 | Weiss ................. 280/504 |
| 2,842,380 A | 7/1958 | Weiss | |
| 4,434,996 A | 3/1984 | Wallace | |
| 4,989,892 A | 2/1991 | Kerins et al. | |
| 5,332,250 A * | 7/1994 | Thorwall et al. ........... 280/507 |
| 5,975,553 A | 11/1999 | Van Vleet | |
| 6,010,142 A | 1/2000 | McCoy et al. | |
| 6,139,043 A | 10/2000 | Gries et al. | |
| 6,889,995 B1 * | 5/2005 | Staggs ................ 280/507 |

FOREIGN PATENT DOCUMENTS

DE 3824028 C1 * 2/1990

* cited by examiner

*Primary Examiner*—Lesley D. Morris
*Assistant Examiner*—Daniel Yeagley
(74) *Attorney, Agent, or Firm*—Mary M. Moyne; Ian C. McLeod

(57) ABSTRACT

A vertically adjustable hitch having a locking latch. The hitch is quickly adjustable along a vertical hitch bar using pins to secure the hitch. The upper portion of the first end of the body is offset from the center of the mounting base for the hitch in a first direction. The first end of the latch is also offset from the center of the mounting bracket. When the offset latch is secured to the offset, upper portion of the body, the single pivot point of the latch is in the center of the mounting base. The hitch has a locking mechanism which allows the latch to be locked in the open or closed position.

23 Claims, 5 Drawing Sheets

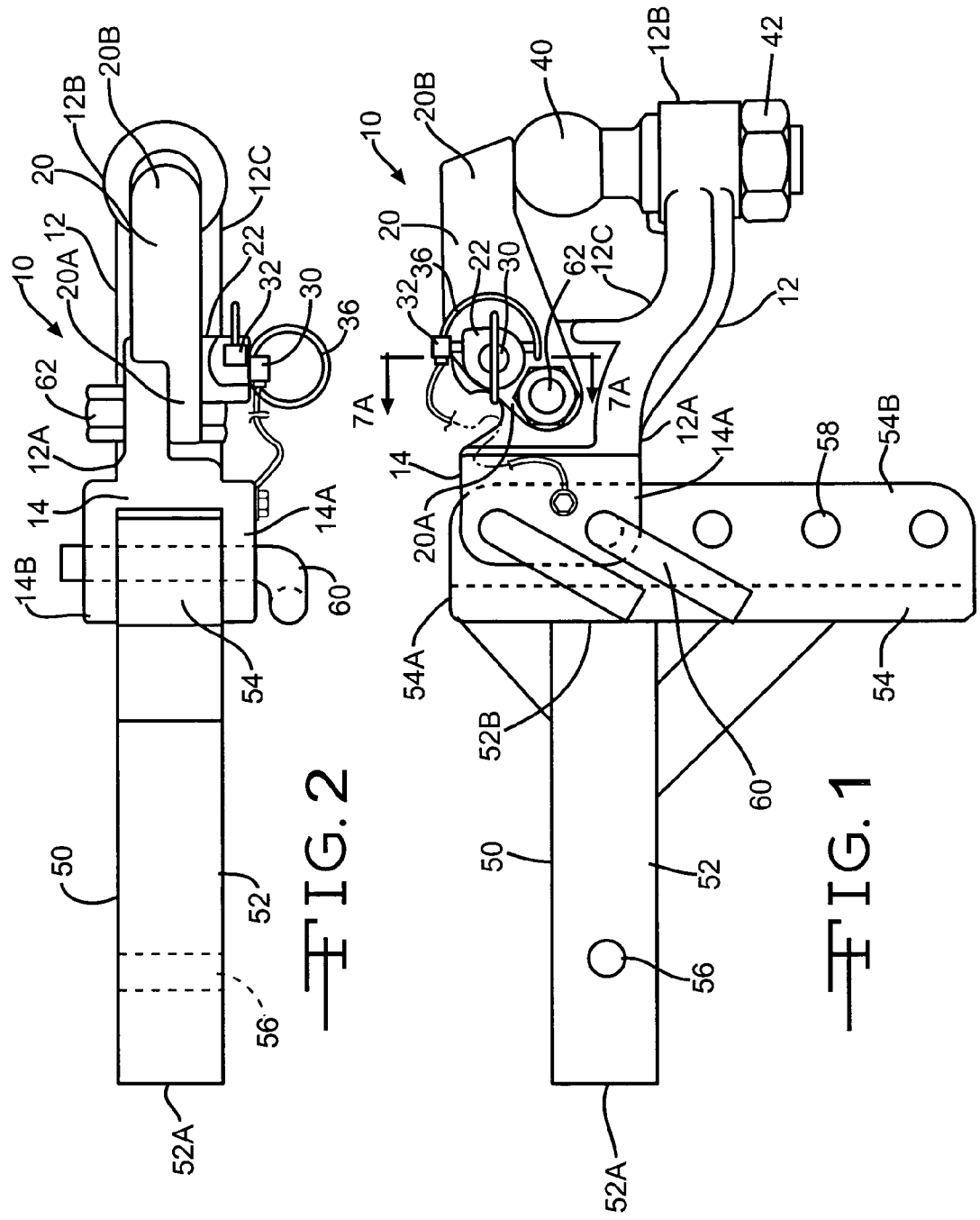

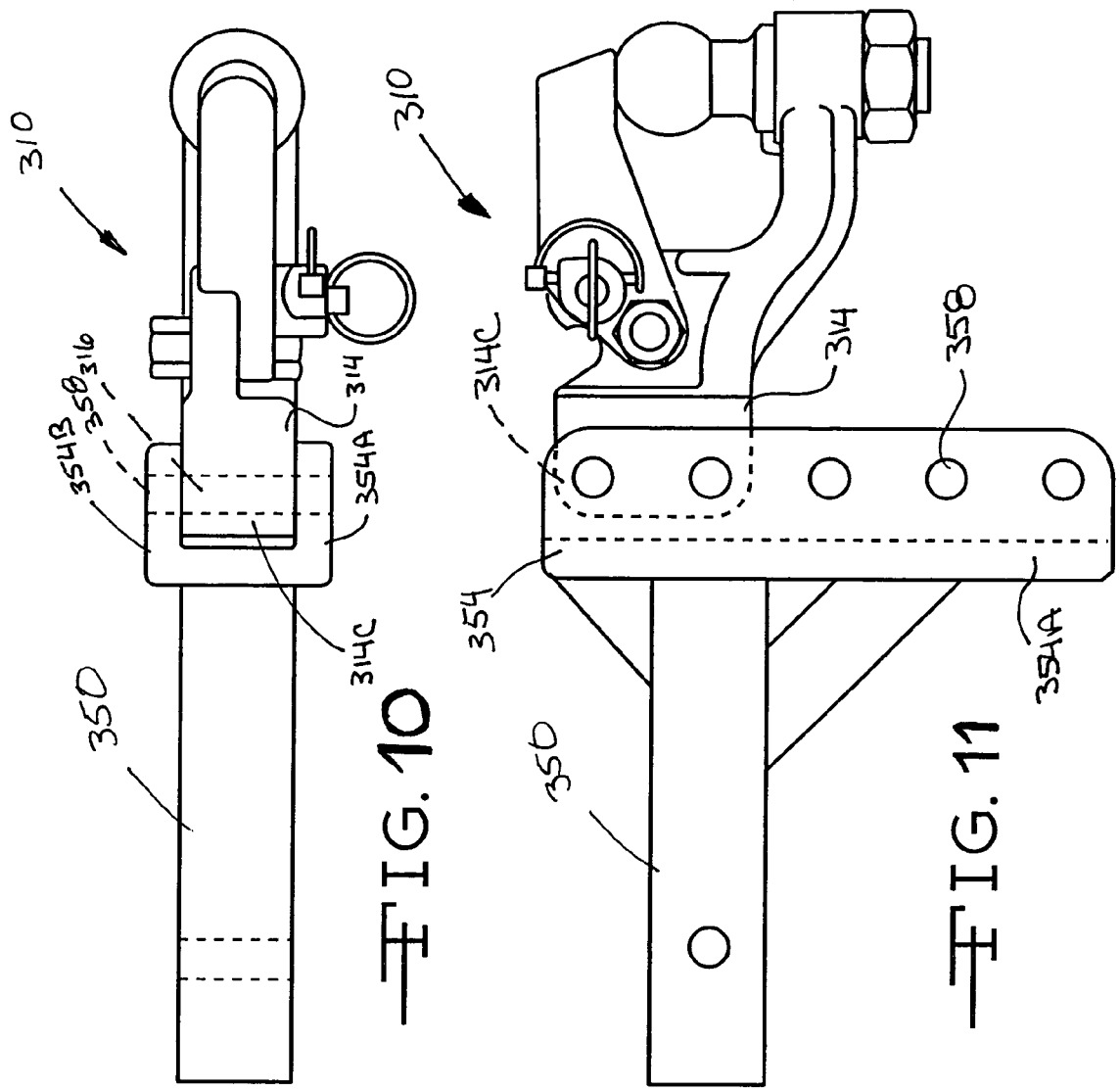

US 7,055,845 B1

ADJUSTABLE HITCH

CROSS-REFERENCE TO RELATED APPLICATIONS

This application claims the benefit of U.S. Provisional Application Ser. No. 60/480,117, filed Jun. 20, 2003.

STATEMENT REGARDING FEDERALLY SPONSORED RESEARCH OR DEVELOPMENT

Not Applicable

BACKGROUND OF THE INVENTION

The present invention relates to an adjustable hitch having a locking latch. In particular, the present invention relates to a pintle type or ball type hitch having an offset, one-piece latch which locks. The present invention also relates to a duplex or standard pintle or ball type hitch which is vertically adjustable.

DESCRIPTION OF THE RELATED ART

Pintle hook or ball hitches and duplex pintle hook or ball hitches are well known in the art. However, in the past, the dog gate or latch was secured to the body by straddling the upper portion of the body of the hitch. Thus, the latch had a U-shaped mounting bracket with parallel legs. The latch was pivotably secured by positioning the upper portion of the body of the hitch between the legs of the latch and inserting a pivoting pin or bolt through the legs and the upper portion of the body to attach the latch to the body. Illustrative are U.S. Pat. No. 4,434,996 to Wallace and U.S. Pat. No. 4,989,892 to Kerins et al. The related art also shows hitches where the latch is spaced between the sides of the body as shown in U.S. Pat. No. 2,842,380 to Weiss. The disadvantages to these previous hitches is that the spaced apart legs of the latch and the spaced apart sides of the body are not as strong as a single, solid construction and are more expensive to construct.

In addition, U.S. Pat. No. 6,139,043 to Gries et al shows a one-piece hitch which uses an integral drawbar and a one-piece latch or upper jaw. However, the latch is off-center from the center of the drawbar.

Furthermore, in the past, pintle-type hitches have been mounted by mounting bolt and nut assemblies to mounting plates or pintle plates which are connected to the towing vehicle. Illustrative of this type of mounting system is U.S. Pat. No. 5,332,250 to Thorwall et al. The disadvantage of this type of mounting system is that the hitch is not easily removed and is not adjustable. To remove the hitch, the bolt and nut assemblies need to be completely removed using tools.

U.S. Pat. No. 5,975,553 to Van Vleet and U.S. Pat. No. 6,010,142 to McCoy et al show height adjustment assemblies for ball hitch coupling devices. However, these patents do not show pintle-type hitches.

There remains a need for an adjustable hitch which can be quickly and easily adjusted to the correct height by removing only two pins and which has a one-piece, offset latch which mounts on the offset first portion of the body so that the latch is centered over the pintle or ball of the hitch.

SUMMARY OF THE INVENTION

The present invention is a vertically adjustable hitch having a locking latch. The hitch can be a pintle type hitch, a hook hitch or a ball hitch. The hitch has a latch with a single mounting section which is attached to the upper or first portion of the first end of the body of the hitch. The upper portion of the first end of the body is offset from the center of the mounting base for the hitch in a first direction. When the latch is attached to the upper portion of the first end of the body, the first end of the latch is also offset from the center of the mounting bracket but in a second direction opposite the first direction. When the offset latch is secured to the offset, upper portion of the body, the single pivot point of the latch is in the center of the mounting base. The offset construction of the latch and the offset construction of the upper portion of the first end of the body allows the latch and the body to have greater strength. In addition, the offset latch can be manufactured as a single piece. The latch can be forged as a one-piece unit and requires no welding.

The hitch has a locking mechanism which allows the latch to be locked in the open or closed position. The locking mechanism includes a hollow extension mounted on the latch, a locking pin mounted in the extension and a biasing spring mounted around the locking pin in the extension. The locking mechanism locks the latch in the closed position by extending the locking pin from the extension through a hole in the latch and into a hole in the body of the hitch. The locking mechanism locks the lock in the open position by extending the locking pin from the extension through a hole in the latch to seat in a curved notch in the top edge of the body at the first end. The spring acts to bias the locking pin toward the locked position. The locking pin can be held in the extended, locked position by a pin keeper which extends through a bore in the extension and through a notch in the locking pin to prevent the locking pin from moving in the extension.

The hitch of the present invention is also vertically adjustable. In one (1) embodiment, the mounting base on the first end of the body has a U-shape with spaced apart first and second legs. The mounting base is secured on a vertical hitch bar so that the legs extend along each side of the hitch bar. The legs of the mounting base have holes which align with holes in the hitch bar. Pins are inserted through the holes in the legs of the mounting base and the hitch bar to secure the hitch to the hitch bar. The pins are easily removed from the holes and the hitch can be moved up or down the hitch bar to adjust a height of the hitch bar. In an alternate embodiment, the hitch bar has spaced apart legs between which is positioned the center portion of the mounting base.

The present invention relates to a hitch for connecting a towing vehicle to a vehicle to be towed, which comprises: a mounting base configured to be connected to the towing vehicle; a body having a first end mounted on the mounting base and a second end configured to be connected to the vehicle to be towed with a center portion extending therebetween, the first end having a first portion with a first side and a second side, the first portion offset from a center of the mounting base so that the first side of the first portion is adjacent the center of the mounting base; and a latch having a first end and a second end with a first side and a second side extending therebetween, the second side of the latch at the first end having a cutout portion wherein the latch is pivotably mounted at the first end on the first portion of the first end of the body so that the cutout portion on the second side of the first end of the latch is adjacent the first side of the first portion of the first end of the body so that when the latch is in a closed position, the second end of the latch is centered over a center of the second end of the body.

Further, the present invention relates to a hitch for connecting a towing vehicle to a vehicle to be towed, which comprises: a mounting base configured to be connected to the towing vehicle; a body having a first end and a second end with a center portion extending therebetween with the first end mounted on the mounting base and the second end configured to be connected to the vehicle to be towed, the first end having a first portion with a first side and a second side, the first portion offset from a center of the mounting base so that the first side of the first portion is adjacent the center of the mounting base; a latch having a first end and a second end with a first side and a second side extending therebetween, the second side of the latch at the first end having a cutout portion wherein the latch is pivotably mounted at the first end on the first portion of the first end of the body so that the cutout portion on the second side of the first end of the latch is adjacent the first side of the first portion of the first end of the body so that when the latch is in a closed position, the second end of the latch is centered over a center of the second end of the body; and a locking mechanism mounted on the first side of the latch adjacent the first end including a locking pin for locking the latch in an open or closed position and a biasing means for moving the locking pin toward a locked position.

Still further, the present invention relates to a hitch for connecting a towing vehicle to a vehicle to be towed, which comprises: a hitch bar configured to be connected to the towing vehicle and having a plurality of holes along a vertical length of the hitch bar; a mounting base having a U-shape with a first leg and a second leg with holes in the legs for mounting along the vertical length of the hitch bar; a body having a first end and a second end with a center portion extending therebetween with the first end connected to the mounting base and the second end configured to be connected to the vehicle to be towed, the first end having a first portion with a first side and a second side and offset from a center of the mounting base so that the first side is adjacent the center of the mounting base; a latch having a first end and a second end with a first side and a second side extending therebetween, the second side having a cutout portion adjacent the first end, wherein the latch is pivotably mounted at the first end on the first portion of the first end of the body so that the cutout portion on the second side of the latch is adjacent the first side of the first portion of the first end of the body so that when the latch is in a closed position, the second end of the latch is centered over a center of the second end of the body; and a locking mechanism mounted on the first side of the latch adjacent the first end, the locking mechanism including a locking pin for locking the latch in an open or closed position and a biasing means for moving the locking pin toward a locked position.

Further still, the present invention relates to a method for towing a vehicle using a hitch, which comprises the steps of: providing a hitch bar having a vertical length; providing a hitch including a mounting base, a body having a first end and a second end with a center portion extending therebetween with the first end configured to be connected to the mounting base and the second end configured to be connected to the vehicle to be towed, the first end having a first portion having a first side and second side and offset from a center of the mounting base so that the first side is adjacent the center of the mounting base, a latch having a first end and a second end with a first side and a second side extending therebetween, the second side having a cutout portion adjacent the first end, wherein the latch is pivotably mounted at the first end on the first portion of the first end of the body so that the cutout portion on the second side of the latch at the first end is adjacent the first side of the first portion of the body; and a locking mechanism including a locking pin and a biasing means for biasing the locking pin toward the locked position; mounting the hitch bar on the towing vehicle; mounting the hitch on the hitch bar by securing the mounting base along the vertical length of the hitch bar; moving the locking mechanism into an unlocked position; moving the latch into an open position; connecting the vehicle to be towed to the second end of the body of the hitch; moving the latch into a closed position; and moving the locking mechanism into a locked position.

The substance and advantages of the present invention will become increasingly apparent by reference to the following drawings and the description.

BRIEF DESCRIPTION OF THE DRAWINGS

FIG. 1 is a side view of the hitch 10 of the present invention showing the hitch bar 50, the mounting base 14, the body 12 and the latch 20.

FIG. 2 is a top view of the hitch 10.

FIG. 10 is a top view of another embodiment of the hitch 310 showing the mounting base 314.

FIG. 11 is a side view of another embodiment of the hitch 310 showing the mounting base 314.

BRIEF DESCRIPTION OF THE PREFERRED EMBODIMENTS

Figure 3:
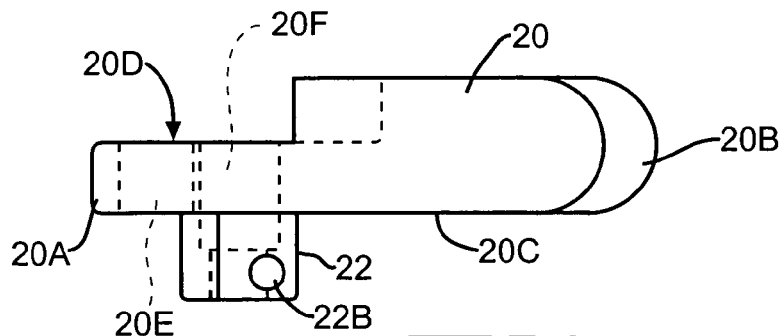
FIG. 3 is a top view of the latch 20.

FIGS. 1 and 2 show the adjustable hitch 10 of the present invention. The hitch 10 includes a body 12 with a dog gate or latch 20 pivotably mounted on the body 12. The body 12 has a first end 12A and a second end 12B with a center portion 12C extending therebetween. A mounting base 14 is provided at the first end 12A of the body 12. The mounting base 14 allows for mounting or attaching the hitch 10 directly on the towing vehicle (not shown) or for mounting the hitch 10 to a mounting plate or pintle plate (not shown) or a hitch bar 50 which is connected to the towing vehicle. The body 12 and the mounting base 14 can be constructed as a unitary piece. In one (1) embodiment, the mounting base is a standard mounting base well known in the art which allows for permanent, in place, mounting of the hitch 10 to the towing vehicle.

In another embodiment, the mounting base 14 allows the hitch 10 to be vertically adjustable along a hitch bar 50. In this embodiment, the mounting base 14 is U-shaped with spaced apart first and second legs 14A and 14B (FIGS. 1 and 2). Each leg 14A or 14B is provided with a pair of holes 16 vertically spaced apart. The holes 16 of the first leg 14A are aligned with the holes 16 of the second leg 14B. The legs 14A and 14B extend outward in a direction opposite the body 12. In one (1) embodiment, when the hitch 10 is mounted on the hitch bar 50, the legs 14A and 14B of the mounting base 14 are essentially horizontal. The hitch bar 50 includes a first section 52 and a second section 54 with first and second ends 52A, 54A, 52B and 54B (FIG. 1). In one (1) embodiment, the first and second sections 52 and 54 are hollow with a square cross-section. The sections 52 and 54 of the hitch bar 50 are mounted together so as to form a 90° angle. The second end 52B of the first section 52 is mounted adjacent the first or top end 54A of the second section 54. In one (1) embodiment, angle braces are provided above and below the mounting point of the first section 52 on the second section 54 to provide strength. The first end 52A of the first section 52 is provided with a hole 56 which allows for securing the hitch bar 50 to the hitch bracket of the towing vehicle. The second section 54 of the hitch bar 50 is provided with a series of vertically spaced holes 58 extending through the second section 54. To secure the hitch 10 on the hitch bar 50, the body 12 of the hitch 10 is positioned so that the mounting base 14 is adjacent the second section 54 of the hitch bar 50 with each leg 14A and 14B of the mounting base 14 extending adjacent a side of the second section 54 of the hitch bar 50. To secure the hitch 10 in position at a desired height on the hitch bar 50, the mounting base 14 is positioned on the second section 54 of the hitch bar 50 so that the hitch 10 is at essentially the desired height and so that the holes 16 in the legs 14A and 14B of the mounting base 14 are aligned with some of the holes 58 in the second section 54 of the hitch bar 50. Pins 60 are then inserted through the holes 16 in the first leg 14A of the mounting base 14, through the holes 58 in the second section 54 of the hitch bar 50 and through the holes 16 in the second leg 14B of the mounting base 14. In one (1) embodiment, the pins 60 are bent pins with a lynch pin keeper at one end to prevent the pins 60 from falling out of the holes 16 and 58. The pins 60 allow for easier and quicker adjustment of the hitch 10 along the vertical height of the second section 54 of the hitch bar 50. The pins 60 are easily inserted and locked in place without the use of tools. Therefore, the height of the hitch 10 is easily and quickly adjusted without the need of tools by a single user. In one (1) embodiment, only two (2) pins 60 are removed and inserted to adjust the hitch 10 and secure the hitch 10 in place on the hitch bar 50.

In another embodiment, the mounting base 314 has a center portion 314C and the second section 354 of the hitch bar 350 has a U-shape with spaced apart first and second legs 354A and 354B (FIG. 10). Each leg 354A and 354B has a series of vertically spaced apart holes 358. Each hole 358 in one leg is aligned with a hole in the other leg. To secure the hitch 310 in position on the hitch bar 350, the center portion 314C of the mounting base 314 is inserted between the first and second legs 354A and 354B of the second section 354 of the hitch bar 350 so that a hole 316 in the center portion 314C of the mounting base 314 is aligned with a hole 358 in each of the legs 354A and 354B of the second section 354 of the hitch bar 350. A pin (not shown) is then inserted into the holes 358 and 316 to secure the hitch 310 to the hitch bar 350. In one (1) embodiment, the pins are bent pins with a lynch pin keeper at one end to prevent the pins from falling out of the holes 316 and 358. The pins allow for easier and quicker adjustment of the hitch 310 along the vertical height of the second section 354 of the hitch bar 350. The pins are easily inserted and locked in place without the use of tools. Therefore, the height of the hitch 310 is easily and quickly adjusted without the need of tools by a single user. In one (1) embodiment, only two (2) pins must be removed and inserted to adjust the hitch 310 and secure the hitch 310 in place on the hitch bar 350.

The first end 12A of the body 12 has a first or upper portion 12E adjacent the mounting base 14. The first portion 12E has a first side 12F and a second side 12G and extends outward perpendicular to the mounting base 14. The first portion 12E of the first end 12A of the body 12 is thinner than the center portion 12C of the body 12. The first portion 12E of the first end 12A of the body 12 is positioned off-center of the center of the mounting base 14. Thus, when the body 12 is viewed from the front, the first portion 12E is to the right of the center of the mounting base 14. In one (1) embodiment, the first portion 12E is positioned so that the first side 12F of the first portion 12E is adjacent the center of the mounting base 14. The center portion 12C of the body 12 extends outward from the center of the mounting base 14 so that the opening 12D in the second end 12B of the body 12 is essentially aligned with or positioned in the center of the mounting base 14. The first portion 12E has a first hole 12H to allow for pivotably mounting the latch 20 on the body 12. The first portion 12E of the first end 12A of the body 12 also has a second or locking hole 12I which allows for receiving the locking pin 30 for locking the latch 20 in the closed position. In one (1) embodiment, a radiused surface or curved notch 12J is provided on a top edge of the first portion 12E of the first end 12A of the body 12 between the mounting base 14 and the second hole 12I of the first portion 12E. The radiused surface 12J is for receiving the locking pin 30 and allows for locking the latch 20 in the open position.

Figure 4:
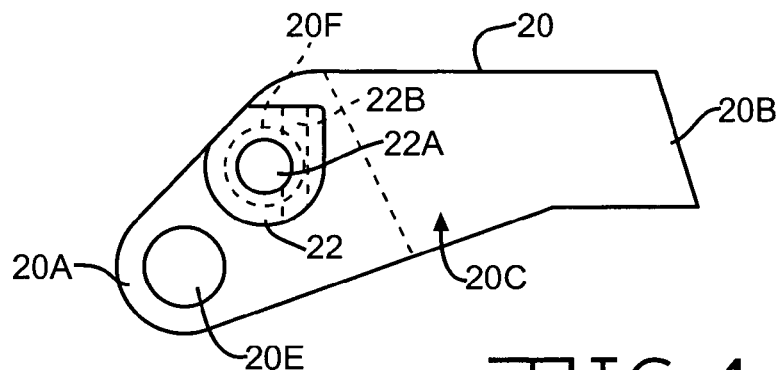
FIG. 4 is a side view of the latch 20.
Figure 5:
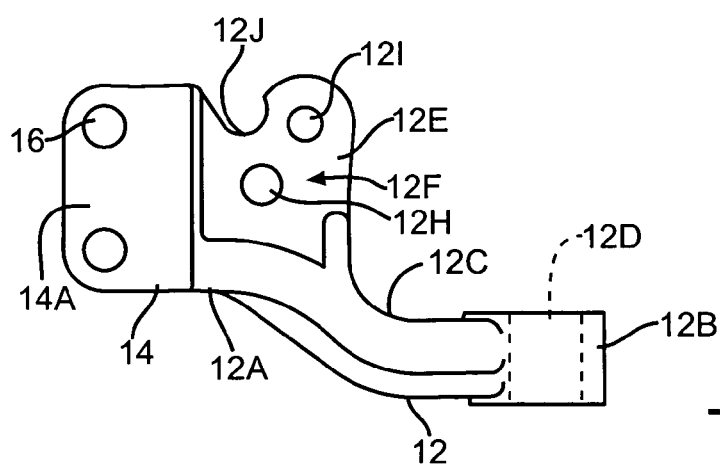
FIG. 5 is a side view of the body 12.

The latch 20 has a first end 20A and a second end 20B with a first side 20C and a second side 20D extending therebetween. In one (1) embodiment, the latch 20 has an angled shape (FIG. 4). The first end 20A of the latch 20 has a cutout portion on the second side 20D which separates the latch 20 into a first section adjacent the first end 20A and a second section adjacent the second end 20B. The first section of the latch 20 is thinner than the second section of the latch 20 so that a shoulder is formed on the second side 20D of the latch 20 at the intersection of the first and second sections. The cutout portion causes the first end 20A of the latch 20 to be offset from the center of the latch 20. The first section of the latch 20 at the first end 20A has a first hole 20E which enables the latch 20 to be pivotably connected to the first portion 12E of the first end 12A of the body 12. The latch 20 is mounted on the body 12 of the hitch 10 so that the first hole 20E of the latch 20 is aligned with the first hole 12H of the body 12 and the second side 20D of the latch 20 at the first section is adjacent the first side 12F of the first portion 12E of the first end 12A of the body 12. Thus, the pivot point or the line of contact between the latch 20 and the first portion 12E of the first end 12A of the body 12 is approximately in the center of the mounting base 14 of the hitch 10. When the latch 20 is mounted on the first portion 12E, the first section 20A of the latch 20 is offset from the center of the mounting base 14 in a direction opposite the first portion 12E. The latch 20 is pivotably mounted to the body 12 by a nut and bolt set 62. The latch 20 is mounted so as to easily pivot between an open and closed position. The size and shape of the first portion 12E of the first end 12A of the body 12 and the first section of the latch 20 is such that as the latch 20 pivots on the first portion 12E of the first end 12A of the body 12, the first portion 12E of the first end 12A of the body 12 remains in the first section of the latch 20 and does not contact the second section of the latch 20. When the latch 20 is correctly positioned on the body 12, the first section or cutout portion of the latch 20 is adjacent the first portion 12E of the first end 12A of the body 12. The thinner first portion 12E of the first end 12A of the body 12 and the thinner first section of the latch 20 allow the second end 20B of the latch 20 to be positioned over the center of the second end 12B of the body 12 and thus, the opening 12D and the ball 40. The offset construction of the latch 20 provides a thicker and stronger unit at the pivot point where the latch 20 connects to the body 12. The latch 20 in one (1) embodiment is constructed as a unitary piece which is easier to assemble.

Figure 7:
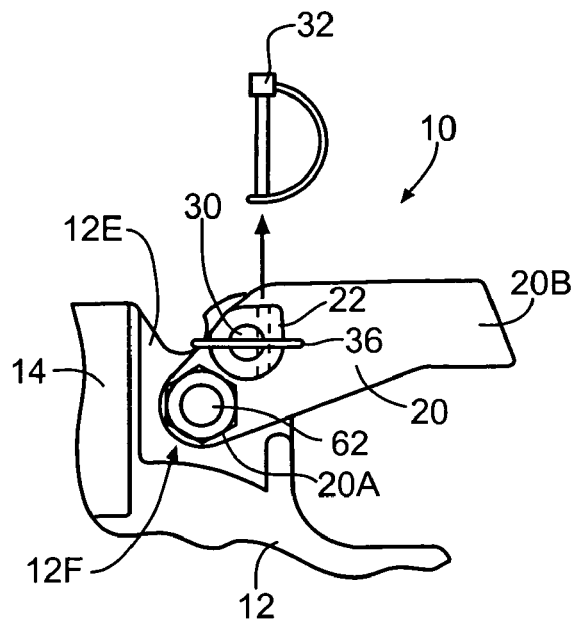
FIG. 7 is a partial side view showing the pin keeper 32 and the locking pin 30.
Figure 8:
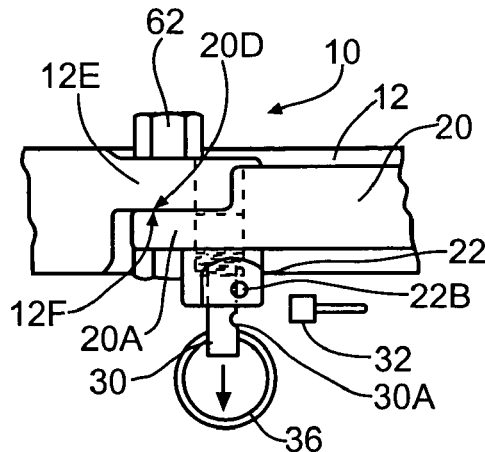
FIG. 8 is a partial top view showing the locking pin 30.
Figure 7A:
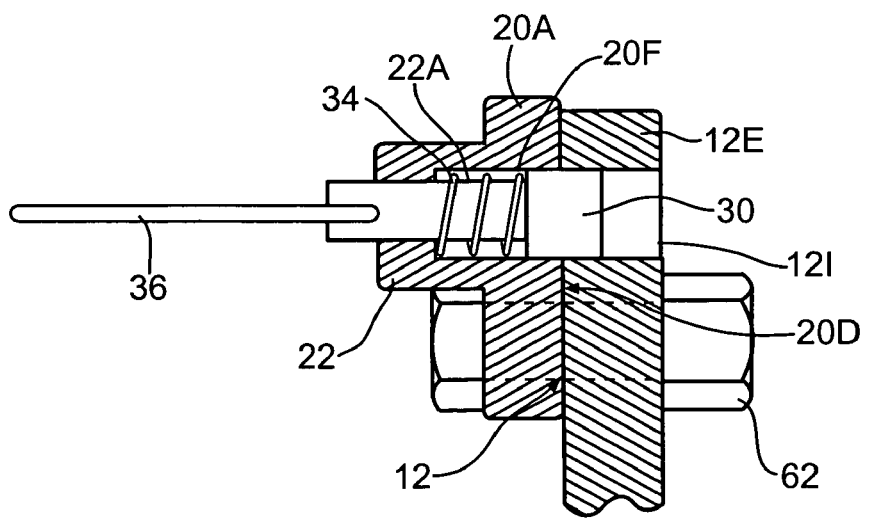
FIG. 7A is a cross-sectional view along the line 7A—7A of FIG. 1 showing the locking pin 30 in the second hole 20F in the latch 20 and the second hole 12I in the first portion 12E of the first end 12A of the body 12.
Figure 9:
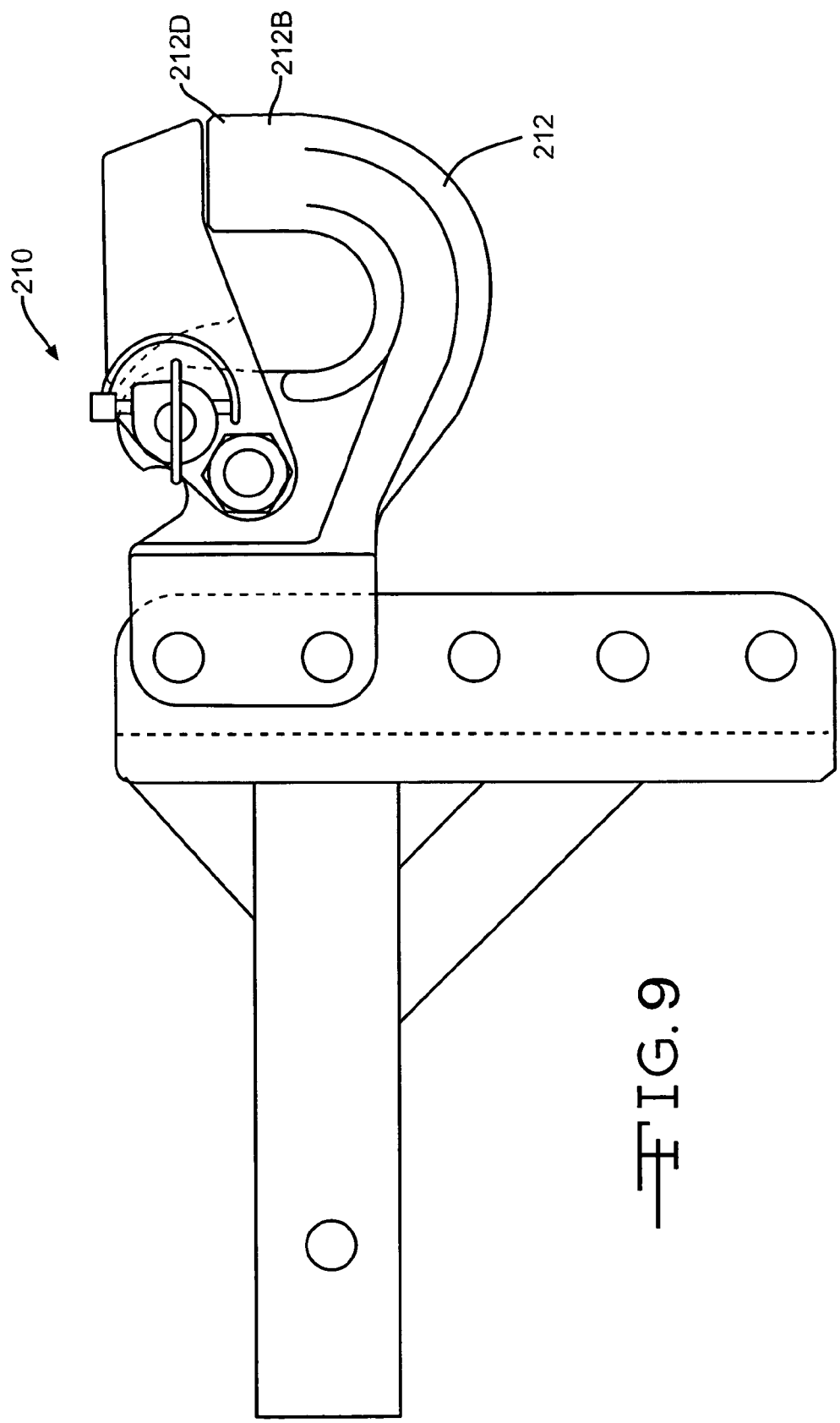
FIG. 9 is a side view of another embodiment of the hitch 210.

A second hole 20F is provided in the latch 20 in the cutout portion of the latch 20 adjacent to and spaced above the first hole 20E. A locking mechanism is provided on the latch 20 adjacent the second hole 20F. The locking mechanism includes a hollow extension 22, a locking pin 30, a spring 34 and a lock pin keeper 32. The extension 22 has a center bore 22A and is mounted on the first side 20C of the latch 20 over and coaxial with the second hole 20F. The extension 22 is provided with a second smaller bore 22B extending adjacent to and essentially perpendicular to the center bore 22A (FIGS. 7 and 8). The locking pin 30 or pull pin is positioned in the center bore 22A of the extension 22. The locking pin 30 has a hook 36 at the first end which allows for easily moving the locking pin 30 to the unlocked position. The spring 34 is positioned around the locking pin 30 inside the extension 22 (FIG. 7A). When the locking pin 30 is moved into the unlocked position, the spring 34 is compressed between the extension 22 and the second end of the locking pin 30. When the user releases the hook 36, the spring 34 acts to automatically move the locking pin 30 toward the locked position. The locking pin 30 has a notch 30A adjacent the first end (FIG. 8). The lock pin keeper 32 is provided for inserting in the second bore 22A in the extension 22 and through the notch 30A in the locking pin 30. When the locking pin 30 is in the locked position, the notch 30A of the locking pin 30 is aligned with the second bore 22A of the extension 22. To secure the locking pin 30 in the locked position, the lock pin keeper 32 is inserted through the second bore 22A in the extension 22 and into the notch 30A in the locking pin 30. The lock pin keeper 32 is connected to the mounting base 14 of the body 12 by a keeper chain to prevent loss of the lock pin keeper 32.

Figure 6:
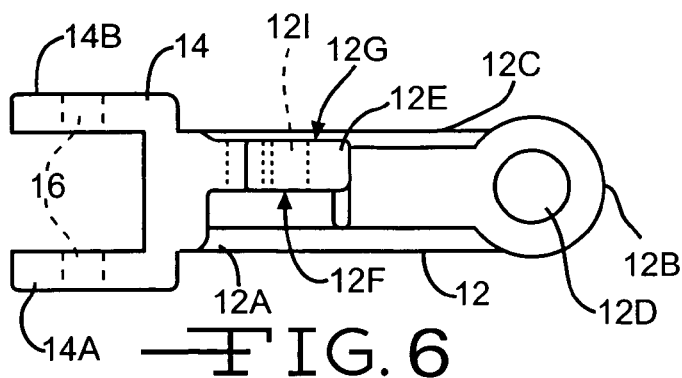
FIG. 6 is a top view of the body 12.

In one (1) embodiment, the hitch 10 is a duplex pintle hook hitch and the second end 12B of the body 12 has an opening 12D which allows for removably mounting a ball 40 to the body 12. The end of the ball 40 opposite the ball is threaded. To mount the ball 40 to the body 12, the threaded end is inserted through the opening 12D in the second end 12B of the body 12. The ball 40 is preferably similar to a standard hitch ball 10 and can have a variety of ball sizes such as 1.875 inch (4.76 cm), 2.0 inch (5.1 cm), 2.3125 inch (5.874 cm) or 3.0 inch (7.6 cm). A nut 42 is then threaded onto the threaded end of the ball 40 to secure the ball 40 to the body 12. It is understood that the ball 40 is easily removable and the opening 12D can be used as the coupling connector. In another embodiment, the hitch 210 is a pintle hitch and the second end 212B of the body 212 has a hook 212D (FIG. 6).

To use the hitch 10 to connect a vehicle to be towed to a towing vehicle, the latch 20 is first moved to the open position. To move the latch 20 to the open position, the latch 20 is unlocked by moving the locking pin 30 to the unlocked position. The locking pin 30 is moved to the unlocked position by removing the lock pin keeper 32 from the second bore 22B in the extension 22 and then pulling on the hook 36 to pull the locking pin 30 out of the second hole 12I in the first portion 12E of the first end 12A of the body 12. Next, the latch 20 is pivoted upward into the open position. When the latch 20 reaches the fully open position, the second hole 20F in the latch 20 is coaxial with the radiused surface or notch 12J on the top edge of the first portion 12E of the first end 12A of the body 12 so that the spring 34 automatically biases the locking pin 30 toward the first portion 12E so that the second end of the locking pin 30 moves into and seats in the radiused surface 12J to secure the latch 20 in the open position. The lock pin keeper 32 is then inserted into the second bore 22B in the extension 22 and through the notch 30A in the locking pin 30 to lock the locking pin 30 in the open position. Next, the vehicle to be towed is connected to the hitch 10 and the latch 20 is moved into the closed position. To close the latch 20, the locking pin 30 is first unlocked by removing the lock pin keeper 32. Next, the latch 20 is unlocked by pulling on the hook 36 of the locking pin 30 to move the second end of the locking pin 30 out of the radiused surface 12J. The latch 20 is pivoted to the closed position so that the second end 20B of the latch 20 is adjacent the top of the ball 40 or hook 212D and the second hole 20F of the latch 20 is aligned with the second hole 12I in the body 12 of the hitch 10. In one (1) embodiment, when the latch 20 is in the closed position, the latch 20 is in contact with the top of the ball 40 or hook 212D. The locking pin 30 is then released so that the spring 34 moves the second end of the locking pin 30 into the second hole 12I of the body 12. In one (1) embodiment, the locking pin 30 is released as soon as the latch 20 is unlocked. The lock pin keeper 32 is inserted into the second bore 22B of the extension 22 and into the notch 30A in the locking pin 30.

It is intended that the foregoing description be only illustrative of the present invention and that the present invention be limited only by the hereinafter appended claims.

I claim:

1. A hitch for connecting a towing vehicle to a vehicle to be towed, which comprises:
   (a) a mounting base configured to be connected to the towing vehicle;
   (b) a body having a first end mounted on the mounting base and a second end configured to be connected to the vehicle to be towed with a center portion extending therebetween, the first end having a first portion with a first side and a second side, the first portion offset from a center of the mounting base so that the first side of the first portion is adjacent the center of the mounting base; and
   (c) a latch having a first end and a second end with a first side and a second side extending therebetween, the second side of the latch at the first end having a cutout portion wherein the latch is pivotably mounted at the first end on the first portion of the first end of the body so that the cutout portion on the second side of the first end of the latch is adjacent the first side of the first portion of the first end of the body so that when the latch is in a closed position, the second end of the latch is centered over a center of the second end of the body.

2. The hitch of claim 1 wherein a contact point between the second side of the latch at the first end and the first portion of the first end of the body is in the center of the mounting base.

3. The hitch of claim 1 wherein a hitch ball is mounted on the second end of the body and wherein when the latch is in the closed position, the second end of the latch is centered over a vertical axis of the hitch ball.

4. The hitch of claim 1 wherein the latch has a locking mechanism which includes a locking pin with a biasing means wherein the locking pin is inserted through a hole in the first portion of the first end of the body to lock the latch in the closed position and seats in a radiused surface in an edge of the first portion of the first end of the body to lock the latch in an open position.

5. The hitch of claim 4 wherein the locking pin has a notch and wherein a pin keeper is inserted into the notch to hold the locking pin in a locked position when the latch is in the closed position and to hold the locking pin in the locked position when the latch is in the open position.

6. The hitch of claim 1 wherein a hitch bar is provided to mount the mounting base to the towing vehicle and wherein the mounting base is vertically adjustable along a vertical length of the hitch bar.

7. The hitch of claim 6 wherein the mounting base is U-shaped with first and second legs, wherein the hitch bar has a series of vertically spaced holes, wherein to adjust a vertical position of the hitch, the mounting base is positioned on the hitch bar so that holes in the first and second legs of the mounting base match the holes in the hitch bar and wherein pins are inserted in the holes in the first and second legs and the hitch bar to secure the hitch on the hitch bar at a set vertical height.

8. The hitch of claim 1 wherein the hitch is a duplex hitch and wherein a hitch ball is mounted in an opening in the second end of the body of the hitch.

9. The hitch of claim 1 wherein the hitch is a standard pintle hitch and wherein the second end of the body of the hitch has a hook.

10. The hitch of claim 1 wherein a locking mechanism for locking the latch in an open and closed position is provided, wherein the locking mechanism includes an extension mounted on the first side of the latch adjacent an opening in the latch, a locking pin and a biasing means adjacent the locking pin and mounted in the extension for biasing the locking pin into a locked position.

11. A hitch for connecting a towing vehicle to a vehicle to be towed, which comprises:
 (a) a mounting base configured to be connected to the towing vehicle;
 (b) a body having a first end and a second end with a center portion extending therebetween with the first end mounted on the mounting base and the second end configured to be connected to the vehicle to be towed, the first end having a first portion with a first side and a second side, the first portion offset from a center of the mounting base so that the first side of the first portion is adjacent the center of the mounting base;
 (c) a latch having a first end and a second end with a first side and a second side extending therebetween, the second side of the latch at the first end having a cutout portion wherein the latch is pivotably mounted at the first end on the first portion of the first end of the body so that the cutout portion on the second side of the first end of the latch is adjacent the first side of the first portion of the first end of the body so that when the latch is in a closed position, the second end of the latch is centered over a center of the second end of the body; and
 (d) a locking mechanism mounted on the first side of the latch adjacent the first end including a locking pin for locking the latch in an open or closed position and a biasing means for moving the locking pin toward a locked position.

12. The hitch of claim 11 wherein a contact point between the second side of the latch at the first end and the first portion of the first end of the body is in the center of the mounting base.

13. The hitch of claim 11 wherein a hitch ball is mounted on the second end of the body and wherein when the latch is in the closed position, the second end of the latch is centered over a vertical axis of the hitch ball.

14. The hitch of claim 11 wherein the locking pin is mounted adjacent a hole in the first end of the latch and when the latch is in the closed position, the locking pin extending through the hole in the first end of the latch and into a hole in the first portion of the first end of the body to lock the latch in the closed position and wherein when the latch is in the open position, the locking pin extends through the hole in the first end of the latch and seats in a radiused surface in an edge of the first portion of the first end of the body to lock the latch in the open position.

15. The hitch of claim 14 wherein the locking pin has a notch and wherein a pin keeper is inserted into the notch to hold the locking pin in a locked position when the latch is in the closed position and to hold the locking pin in the locked position when the latch is in the open position.

16. The hitch of claim 11 wherein the mounting base is U-shaped with first and second legs, wherein a hitch bar has a series of vertically spaced holes, wherein to adjust a vertical position of the hitch, the mounting base is positioned on the hitch bar so that holes in the first and second legs of the mounting base match the holes in the hitch bar and wherein pins are inserted in the holes in the first and second legs and the hitch bar to secure the hitch on the hitch bar at a set vertical height.

17. The hitch of claim 11 wherein the locking pin has a notch and wherein a pin keeper is inserted into the notch to hold the locking pin in a locked position when the latch is in the closed position and to hold the locking pin in the locked position when the latch is in the open position.

18. A hitch for connecting a towing vehicle to a vehicle to be towed, which comprises:
 (a) a hitch bar configured to be connected to the towing vehicle and having a plurality of holes along a vertical length of the hitch bar;
 (b) a mounting base having a U-shape with a first leg and a second leg with holes in the legs for mounting along the vertical length of the hitch bar;
 (c) a body having a first end and a second end with a center portion extending therebetween with the first end connected to the mounting base and the second end configured to be connected to the vehicle to be towed, the first end having a first portion with a first side and a second side and offset from a center of the mounting base so that the first side is adjacent the center of the mounting base;
 (d) a latch having a first end and a second end with a first side and a second side extending therebetween, the second side having a cutout portion adjacent the first end, wherein the latch is pivotably mounted at the first end on the first portion of the first end of the body so that the cutout portion on the second side of the latch is adjacent the first side of the first portion of the first end of the body so that when the latch is in a closed position, the second end of the latch is centered over a center of the second end of the body; and
 (e) a locking mechanism mounted on the first side of the latch adjacent the first end, the locking mechanism including a locking pin for locking the latch in an open or closed position and a biasing means for moving the locking pin toward a locked position.

19. The hitch of claim 18 wherein to lock the latch when the latch is in the closed position, the locking pin extends through a hole in the first end of the latch and through a hole in the first portion of the first end of the body.

20. The hitch of claim 18 wherein to lock the latch when the latch is in the open position, the locking pin extends through a hole in the first end of the latch and seats in a radiused surface in an edge of the first portion of the first end of the body.

21. A method for towing a vehicle using a hitch, which comprises the steps of:
   (a) providing a hitch bar having a vertical length;
   (b) providing a hitch including a mounting base, a body having a first end and a second end with a center portion extending therebetween with the first end configured to be connected to the mounting base and the second end configured to be connected to the vehicle to be towed, the first end having a first portion having a first side and second side and offset from a center of the mounting base so that the first side is adjacent the center of the mounting base, a latch having a first end and a second end with a first side and a second side extending therebetween, the second side having a cutout portion adjacent the first end, wherein the latch is pivotably mounted at the first end on the first portion of the first end of the body so that the cutout portion on the second side of the latch at the first end is adjacent the first side of the first portion of the body; and a locking mechanism including a locking pin and a biasing means for biasing the locking pin toward the locked position;
   (c) mounting the hitch bar on the towing vehicle;
   (d) mounting the hitch on the hitch bar by securing the mounting base along the vertical length of the hitch bar;
   (e) moving the locking mechanism into an unlocked position;
   (f) moving the latch into an open position;
   (g) connecting the vehicle to be towed to the second end of the body of the hitch;
   (h) moving the latch into a closed position; and
   (i) moving the locking mechanism into a locked position.

22. The method of claim 21 wherein the hitch bar has holes along the vertical length, wherein the mounting base has a U-shape with a first leg and a second leg with holes in each of the legs, wherein the mounting base is secured on the hitch bar so that the legs extend along either side of the hitch bar and wherein in step (d), a height of the hitch on the hitch bar is adjustable by moving the mounting base along the vertical length of the hitch bar until the hitch is at essentially a correct height and the holes in the legs of the mounting base are aligned with holes in the hitch bar and then inserting pins through the holes in the legs of the mounting base and holes of the hitch bar to secure the mounting base on the hitch bar.

23. The method of claim 21 wherein in step (e), to move the locking mechanism to the unlocked position, the locking pin is withdrawn from a hole in the first portion of the first end of the body and wherein in step (f), when the latch is moved to the open position, the biasing means moves the locking pin from the unlocked position into the locked position so that the locking pin seats in a radiused surface in an edge of the first portion of the first end of the body to lock the latch in the open position.

* * * * *